United States Patent [19]
Moorehead

[11] 3,760,120

[45] Sept. 18, 1973

[54] LOCKOUT SELECTION CIRCUIT

[75] Inventor: Thomas J. Moorehead, Brockville, Ontario, Canada

[73] Assignee: GTE Automatic Electric Laboratories Incorporated, Northlake, Ill.

[22] Filed: July 27, 1972

[21] Appl. No.: 275,593

[52] U.S. Cl. ................................ 179/19, 179/18 FA
[51] Int. Cl. ........................................... H04m 3/16
[58] Field of Search ...................... 179/18 FA, 18 F, 179/19, 17 B, 38, 30

[56] References Cited

UNITED STATES PATENTS 2,928,008 3/1960 Takahasi et al. ....................... 307/88

2,914,747 11/1959 Straube ............................... 340/155

*Primary Examiner*—Thomas W. Brown
*Attorney*—K. Mullerheim et al.

[57] ABSTRACT

In a system in which a number of units operate one at a time with common apparatus, a lockout circuit comprises a set of NAND gates, one for each unit. Each gate has a seize input normally at logical "0" from its unit and an enable output normally at logical "1" thereto. The output of each gate is also connected to an input of each of the others, so that only one gate at a time may have a "0" output to enable its unit for operation with the common apparatus.

2 Claims, 2 Drawing Figures

BIU CONTROL A

LOCKOUT SELECTION CIRCUIT

BACKGROUND OF THE INVENTION

1. Field of the Invention

This invention relates to a lockout selection circuit, and more particularly to a circuit arrangement for use in a system in which a plurality of units may each use a common apparatus one at a time, in which each unit when it is ready to use the common apparatus produces a seize signal, and in response thereto a lockout selection circuit arrangement supplies that unit with an enable signal and inhibits the enable signal for all other units even though they produce a seize signal until the enabled unit removes its seize signal.

2. Description of the Prior Art

There are many known lockout selection circuits. Some of the prior art arrangements use gas tubes, four layer diodes, or other types of devices which normally have a high impedance and breakdown to a low impedance state when a given voltage is applied across them; and other piror art lockout selection circuit arrangements use relays with chain circuits through the contacts of the several relays to permit only one relay of the chain to operate. However for systems which are implemented with integrated circuits, it would be highly desirable to have a lockout selection circuit which also makes use of circuits available on integrated circuit chips.

SUMMARY OF THE INVENTION

An object of this invention is to provide a simple and effective lockout selection circuit which may be implemented with logic circuits such as those available as integrated circuits.

According to the invention, a lockout selection circuit comprises a plurality of NAND or NOR gates with an individual gate for each of a plurality of units which may operate with common apparatus one at a time, in which each gate has a seize input from its individual unit and its output is connected as an enable input to its individual unit; and the output of each gate is also connected to an input of each of the other gates so that a gate having its enable signal in the effective condition inhibits each of the other gates. Normally all of the units of the system are idle with the seize and enable signals both inactive, the enable signal level being opposite to that of the seize signal level. With NAND gates the seize level is "0", and all of the gates of the lockout selection circuit have their outputs normally at "1".

Note that a lockout selection circuit according to the invention with two units, the two NAND gates are connected in a circuit configuration resembling a latch. However the circuit differs from a latch in that both outputs are at the same signal level when both seize inputs are at the level for the idle state.

CROSS-REFERENCE TO RELATED APPLICATIONS

This invention is disclosed in a copending patent application by R. A. Borbas et al. for a Communication Switching System with Modular Organization and Bus, Ser. No. 255,485 filed May 22, 1972. The disclosure of the lockout circuit arrangement in the bus interface unit is my invention and was derived from me for use in that system. The combination of the lockout selection circuit with bus control circuits as disclosed herein was invented by R. A. Borbas, and is covered by a copending application Ser. No. 295,630, filed Oct. 6, 1972.

DESCRIPTION OF PREFERRED EMBODIMENT IN A GENERALIZED SYSTEM

Figure 1:
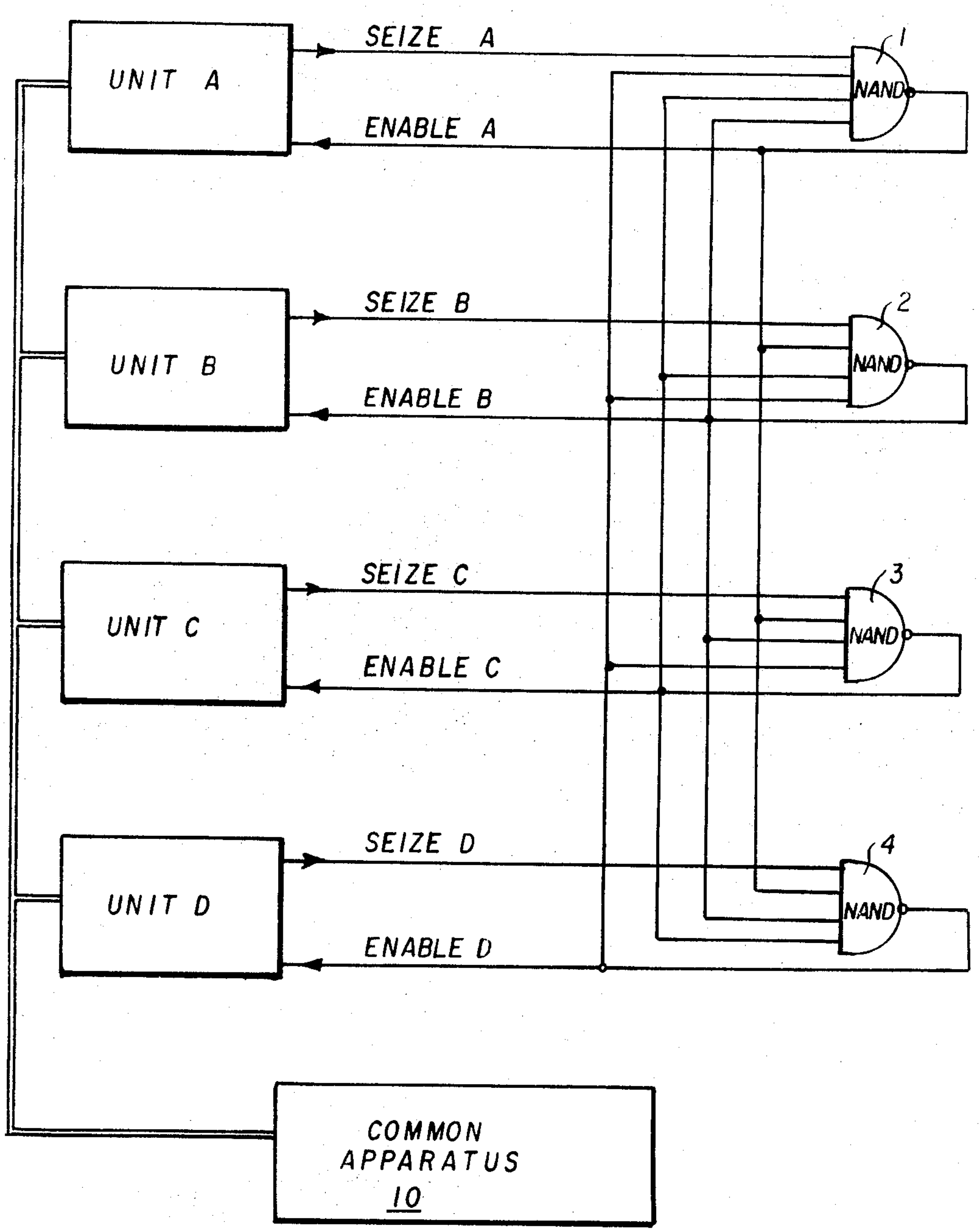
FIG. 1 is a block and schematic diagram showing a lockout selection circuit in a general system embodiment.

FIG. 1 shows a generalized system environment in which a number of individual units shown as unit A, unit B, unit C and unit D each need to temporarily operate in conjunction with common apparatus 10 from time to time during their operation. The nature of the common apparatus 10 in this situation is such that it may operate with only one of the individual units at a time. There are many instances of this type of system organization in the digital data processing art, in the telephone switching art, and in many other fields. For example the individual units may be peripheral units of a computing system, and the common apparatus may be a central processor or memory access circuits. To permit an individual unit to become connected for operation with the common apparatus and to prevent other units from obtaining access thereto until the one unit has completed its use thereof, a lockout circuit comprising NAND gates 1, 2, 3 and 4 is provided. Each of the NAND gates is individually associated with one of the units, and has an input for a seize signal such as SEIZE A lead to gate 1, and an output for enabling that unit such as lead ENABLE A from gate 1. Normally none of the individual units is operating with the common apparatus 10, and in this case the signal condition on all of the seize leads is a logical 0 and all of the NAND gates of the lockout circuit have their outputs at a logical 1. The output of each NAND gate is connected to one of the inputs of each of the other NAND gates. The operation of a NAND gate is such that when all of the inputs are at the 1 level the output is 0 level, and when any one of the inputs are 0 the output is 1. In many NAND gates implemented with integrated circuits, the 1 level is ground potential or a small positive potential referred to as "low", and the logical 1 is a positive potential referred to as the "high" level. Thus normally each of the NAND gates has a 0 on its seize input and a 1 on each of the other inputs and the output is a 1.

Whenever any one of the units comes to a point in its operation in which it needs to operate with the common apparatus it applies a logical 1 on its seize lead which in conjunction with the logical 1's at the other inputs causes its output to go to 0. This is the signal condition on the enable lead which actuates circuits in that unit and in the common apparatus so that that unit is then operating with the common apparatus. For example assume that unit A supplies a 1 on its lead SEIZE A which causes the NAND gate 1 to supply its output as a 0 level on lead ENABLE A to actuate unit A to operate with the common apparatus 10. This same output signal on lead ENABLE A applies a 0 at an input of each of the other gates 2, 3 and 4 which effectively maintains them in a state in which their outputs remain at 1. In the meantime if one of the other units attempts to seize the common apparatus, for example by unit C applying a 1 on lead SEIZE C it is ineffective to change the state of its NAND gate 3, since all of its inputs must be at 1 to do so. As soon as unit A has finished its operation with the common apparatus 10 it changes the signal on lead seize A back to 0, which regardless of the levels at all of the other inputs changes the output on lead ENABLE A to 1, which releases the operative association of unit A with the common apparatus 10. Immediately upon the signal on lead ENABLE A becoming a 0, the state of NAND gate 3 changes to supply a 0 on its output to lead ENABLE C to permit unit C to operate with the common apparatus 10 and to inhibit the other NAND gates 1, 2 and 4 so as to maintain their outputs at 1.

PREFERRED EMBODIMENT IN A SPECIFIC SYSTEM

Figure 2:
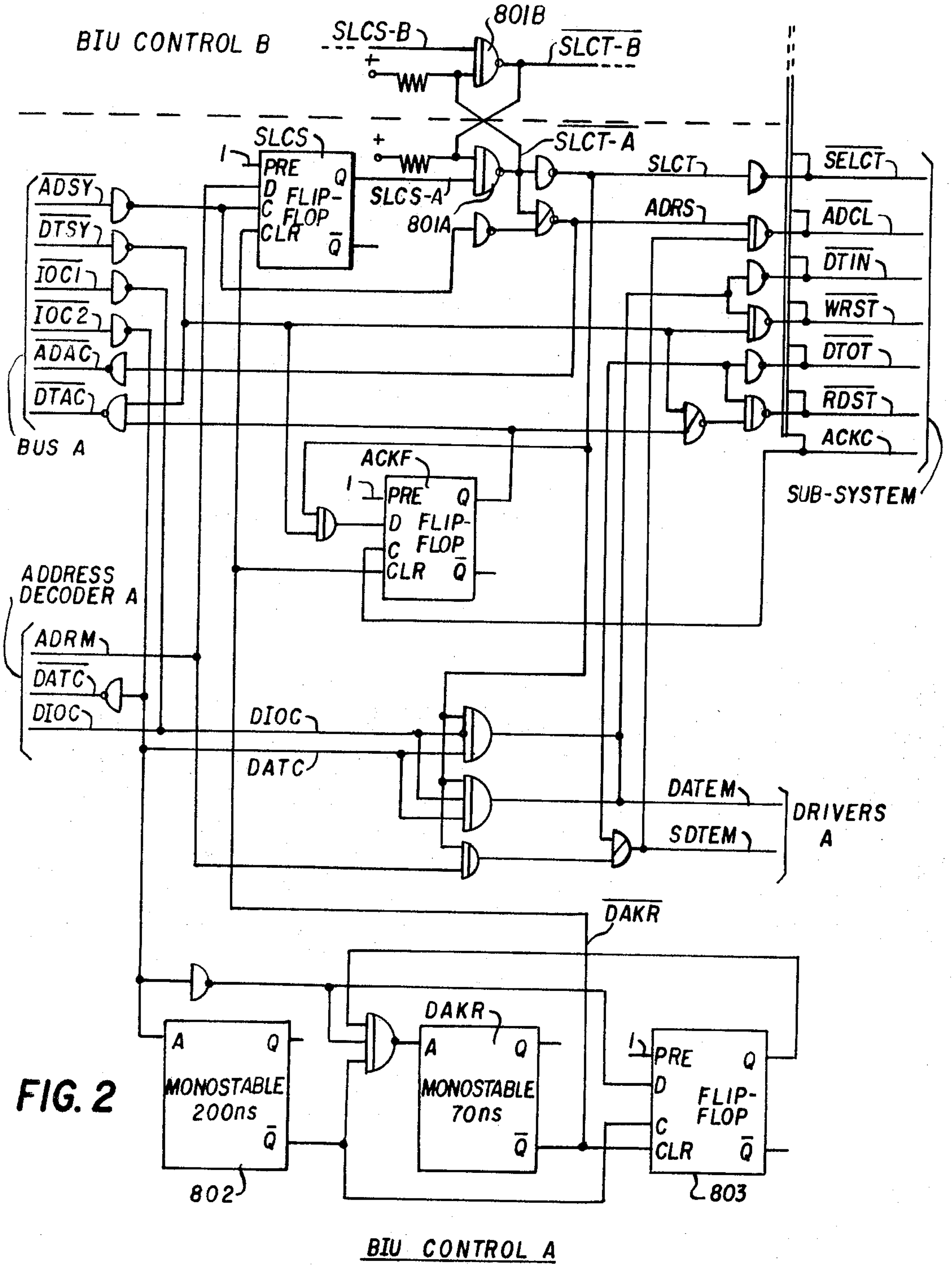
FIG. 2 is a functional block and schematic diagram of a portion of the bus interface unit showing the lockout selection circuit arrangement as shown in said Borbas et al. patent application.

FIG. 2 shows the lockout selection circuit according to my invention incorporated in the system noted in the section entitled "CROSS-REFERENCE TO RELATED APPLICATIONS". That system comprises an arrangement in which duplicate central processors are each connected via its own bus to a number of modular subsystems treated as memory by the central processor. In each module there is a bus interface unit with duplicate circuits for coupling either of the buses to the subsystem. Each half of the bus interface unit contains gates for connecting data connectors of the bus to the subsystem, and control circuits connected to control conductors of the bus and control conductors to the subsystem. FIG. 2 shows only the control of one of these bus interface units BIU, showing the BIU control A for one-half of the bus interface unit, with the lockout selection circuit portion of the other BIU control B circuit shown. Thus the BIU control A has six control conductors connected to bus A, and similarly BIU control B has corresponding six conductors connected to bus B (not shown). Both BIU control A and BIU control B have common connections to seven control conductors to the subsystem, and there are also similar data conductors connected in common to the subsystem (not shown).

Each of the bus interface units BIU is arranged to be seized using a bus control unit associated with the central processor when an address is supplied via the data conductors of one of the buses and an address synchronization signal arrives on a lead $\overline{\text{ADSY}}$. The address is decoded in circuits (not shown) in the bus interface unit and when a particular subsystem is addressed a signal as a logical 1 appears on lead ADRM, which enables a selection flip-flop SLCS. Then when the synchronization signal appears on lead $\overline{\text{ADSY}}$ it is inverted and applied to the clock input of the flip-flop to set it. The output of this flip-flop on lead SLCS–A is a seizure signal for BIU control A.

A lockout selection circuit comprises a NAND gate 801A in BIU control A, and a similar NAND gate 801B in BIU control B. Each of these NAND gates has its output connected to an input of the other NAND gate. Normally the signals on the seizure leads SLCS–A and SLCS–B are at logical 0 and the outputs of these NAND gates are at logical 1. When the flip-flop SLCS is set the signal on lead SLCS–A at level 1 changes NAND gate 801A so that its output is 0, which inhibits NAND gate 801B from changing state and maintains its output at a 1. The output of gate 801A is inverted and appears on lead SLCT. This signal enables several gates in BIU control A to operate with bus A and with the subsystem as fully explained in said copending applications. When the operation is completed a signal on lead $\overline{\text{DAKR}}$ is applied to the CLR inputs of the flip-flop SLCS and also a flip-flop ACKF to reset them so that their outputs Q are at 0. This changes the signal on lead SLCS–A to a 0 to return gate 801A to have an output 1. If in the meantime the same bus interface unit is attempted to be seized from bus B the signal on lead SLCS–B will be 1, and NAND gate 801B will change states to have its output at 0 so that its operation may proceed operating with bus B and the common subsystem.

What is claimed is:

1. A lockout selection circuit for use in a system in which a plurality of units may operate in conjunction with common apparatus one at a time, said lockout circuit comprising a plurality of gate means with an individual gate means for each unit;

the gate means being each of a type having a plurality of inputs and an output in which responsive to at least one input of a gate means having a signal at a first level the output signal is at a second level, and responsive to all of the inputs of a gate means having signals at the second level the output signal is at the first level;

each gate means has a number of inputs equal to the number of said units, one input being a seize lead connected to its own unit and its output being an enable lead connected to its own unit, the other inputs being connected respectively to the outputs of the other gate means;

the seize lead of each idle unit having a signal at the first level so that its enable lead is at the second level whereby with all units idle all of the output signals are at the second level, the seize lead of any unit which is active and desiring to use the common apparatus having a signal at the second level, one gate means having its seize lead signal at the second level producing the first level at its output which inhibits all the other gate means to maintain their output signals at the second level regardless of the signal level on their seize lead, while the gate means having the first level at its output via its enable lead signals its own unit to operate with the common apparatus, and as soon as it finishes its operation and returns its seize lead to the first level, to permit another unit having its seize lead at the second level to change its enable lead signal to the first level.

2. A lockout circuit as claimed in claim 1, wherein each of said gate means is a NAND gate, the first level is low for a logical "0", and the second level is high for a logical "1".

* * * * *